US011807360B2

(12) United States Patent
Lorenz

(10) Patent No.: US 11,807,360 B2
(45) Date of Patent: Nov. 7, 2023

(54) WING FOR AN AIRCRAFT

(71) Applicant: AIRBUS OPERATIONS GMBH, Hamburg (DE)

(72) Inventor: Christian Lorenz, Hamburg (DE)

(73) Assignee: AIRBUS OPERATIONS GmbH, Hamburg (DE)

(*) Notice: Subject to any disclaimer, the term of this patent is extended or adjusted under 35 U.S.C. 154(b) by 114 days.

(21) Appl. No.: 17/427,503

(22) PCT Filed: Jun. 24, 2020

(86) PCT No.: PCT/EP2020/067715
§ 371 (c)(1),
(2) Date: Jul. 30, 2021

(87) PCT Pub. No.: WO2020/260399
PCT Pub. Date: Dec. 30, 2020

(65) Prior Publication Data
US 2022/0135205 A1 May 5, 2022

(30) Foreign Application Priority Data
Jun. 28, 2019 (DE) ...................... 10 2019 117 583.6

(51) Int. Cl.
B64C 3/56 (2006.01)
B64C 3/54 (2006.01)
(52) U.S. Cl.
CPC ................ B64C 3/56 (2013.01); B64C 3/546 (2013.01)

(58) Field of Classification Search
CPC ... B64C 3/56; B64C 3/546; F16H 2025/2078; F16H 2025/2081; F16H 25/2204
See application file for complete search history.

(56) References Cited

U.S. PATENT DOCUMENTS 5,310,138 A 5/1994 Fitzgibbon
2017/0023031 A1* 1/2017 Wildman .............. F15B 15/088
2018/0156293 A1 6/2018 Fox et al.
(Continued)

FOREIGN PATENT DOCUMENTS

EP 1 600 665 11/2005
EP 2 899 119 7/2015
(Continued)

OTHER PUBLICATIONS

German Search Report for Application No. DE 10 2019 117 583.6, dated Mar. 3, 2020, 6 pages.
(Continued)

Primary Examiner — Rodney A Bonnette
(74) Attorney, Agent, or Firm — Nixon & Vanderhye P.C.

(57) ABSTRACT

A wing for an aircraft is disclosed having a fixed wing, a foldable wing tip portion, and a flight latch device for latching the foldable wing tip portion in the extended position, wherein the flight latch device includes a housing, a latch bolt linearly movable relative to the housing, and a motor for driving the latch bolt. The flight latch device includes a threaded shaft having an external thread and being mounted to the housing in a torque proof manner, the flight latch device includes a nut having an internal thread engaging the external thread of the shaft, so that the nut can rotate about the shaft along the external thread.

15 Claims, 3 Drawing Sheets

(56) References Cited

U.S. PATENT DOCUMENTS

| | | | |
|---|---|---|---|
| 2018/0320767 A1 | 11/2018 | Crine et al. | |
| 2018/0340597 A1* | 11/2018 | Greb | F16H 25/2252 |
| 2019/0016386 A1* | 1/2019 | Kurita | F16C 19/06 |
| 2019/0044409 A1* | 2/2019 | Matsuto | F16C 33/581 |
| 2019/0264788 A1* | 8/2019 | Shimizu | F16H 25/2204 |
| 2022/0111885 A1* | 4/2022 | Raither | B62D 6/008 |
| 2022/0126980 A1* | 4/2022 | Lorenz | F16H 25/2204 |

FOREIGN PATENT DOCUMENTS

| | | |
|---|---|---|
| EP | 3 357 808 | 8/2018 |
| EP | 3 575 203 | 12/2019 |

OTHER PUBLICATIONS

International Search Report for PCT/EP2020/067715 dated Oct. 7, 2020, 3 pages.
Written Opinion of the ISA for PCT/EP2020/06775, dated Oct. 7, 2020, 6 pages.

\* cited by examiner

WING FOR AN AIRCRAFT

CROSS REFERENCE TO RELATED APPLICATIONS

The present application is a National Phase of International Application Number PCT/EP2020/067715, filed Jun. 24, 2020, which designated the U.S. and claims priority benefits from German Patent Application Number DE 10 2019 117 583.6, filed Jun. 28, 2019, the entire contents of each of which are hereby incorporated by reference.

BACKGROUND AND SUMMARY

The present invention relates to a wing for an aircraft, in particular to a foldable wing including a fixed wing and a foldable wing tip portion. A further aspect of the invention relates to a flight latch device for latching the foldable wing tip portion of such a wing for an aircraft in an extended position with respect to the fixed wing. Yet a further aspect of the invention relates to an aircraft comprising such a wing and/or such a flight latch device.

Such a wing comprises a fixed wing for being mounted to a fuselage, and a foldable wing tip portion mounted to the fixed wing via a hinge or hinges rotatable about a hinge axis between an extended position, where the foldable wing tip portion extends as a continuous extension of the fixed wing preferably in a common plane with the fixed wing, and a folded position, where the foldable wing tip portion extends upwards or rearwards in order to reduce the overall span of the aircraft compared to the extended position. Specifically, when the foldable wing tip portion is foldable upwards, the hinge axis extends in a horizontal plane and/or in parallel to a chord line and/or in parallel to the wing surface and/or in a flight direction of the aircraft. Alternatively, when the foldable wing tip portion is foldable rearwards, the hinge axis extends in a vertical direction and/or in a wing depth direction and/or in a direction transverse or perpendicular to the wing surface.

Preferably, the wing also comprises an actuation unit for actuating the foldable wing tip portion for movement about the hinge axis relative to the fixed wing, i.e. for movement between the extended and the folded positions. The actuation unit might be formed in various ways, e.g. as a rack and pinion drive, and might be mounted between the fixed wing and the foldable wing tip portion near the hinge axis.

The wing further comprises a flight latch device for latching the foldable wing tip portion in the extended position. The flight latch device comprises a housing, a latch bolt, and a motor. The housing is fixedly mounted to one of the fixed wing and the foldable wing tip portion. The term "housing" within the meaning of the invention includes any load bearing base structure of the flight latch device and is not limited to a mere outer casing. The latch bolt extends elongated along a latch axis, is supported at the housing, preferably inside the housing, and is linearly movable relative to the housing along the latch axis between a latched position, where the latch bolt engages corresponding latch lugs of the foldable wing tip portion and/or the fixed wing, and an unlatched position, where the latch bolt is disengaged with the latch lug of at least one of the foldable wing tip portion and the fixed wing. Preferably, the housing is mounted to the fixed wing and the latch bolt in the latched position engages latch lugs of both the fixed wing and the foldable wing tip portion, while in the unlatched position the latch bolt is disengaged at least from the latch lug or lugs of the foldable wing tip portion, preferably from the latch lugs of both the foldable wing tip portion and the fixed wing. The motor is preferably an electric motor and is supported at the housing and/or at the latch bolt and is configured for driving the latch bolt between the latched position and the unlatched position.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

Due to the latch bolt necessarily having a certain length to engage the latch lugs and the motor and/or gear unit being arranged in extension of the latch bolt, the flight latch device requires considerable space, specifically length, in the area of the hinge, where for many reasons smaller parts are preferred.

Accordingly, the object of the present invention is to provide a wing having a flight latch device with reduced space requirements.

This object is achieved in that the flight latch device comprises a threaded shaft extending elongated along a shaft axis, having an external thread and being mounted to the housing in a torque proof manner, i.e. not rotatable about the shaft axis. The flight latch device comprises a nut having an internal thread engaging the external thread of the shaft, so that the nut can rotate about the shaft along the external thread. The motor is arranged coaxially around the nut. An inner rotor part of the motor is mounted to the nut in a torque proof manner. Torque proof in this connection means either fixedly, so that no relative rotation about the shaft axis is allowed between the nut and the rotor part, or unfixedly via a gear unit, specifically a planet reduction gear, for controlled relative rotation of the nut and the rotor part about the shaft axis. An outer stator part of the motor is connected to the rotor part in such a way that it is rotatable about the shaft axis and linearly fixed to the rotor part, e.g. via a first roller bearing. Further, the stator part is connected to the housing by a first linear guide allowing linear movement in parallel to the shaft axis and inhibiting rotation of the stator part about the shaft axis, e.g. by a groove and tongue guide. The nut, in turn, is connected to the latch bolt, integrally or two separate parts that are coupled, for common linear movement with the latch bolt, preferably by a linearly fixed connection. The nut being connected to the latch bolt might include that either the nut is formed integrally with the latch bolt or the nut and the latch bolt are formed as two separate parts that are coupled to one another.

In such a way, a very compact, in particular short flight latch device with reduced space requirements is provided. When the motor is switched on, the stator part rotates together with the nut along the external thread of the shaft and moves the latch bolt coupled to the nut in the axial direction between the latched and unlatched positions.

According to a preferred embodiment, the shaft is formed as ball screw and the nut is formed as ball nut so that the internal thread of the nut engages the external thread of the shaft by a ball bearing including balls running in corresponding grooves of the internal and external threads. In such a way, a very low friction bearing is provided.

According to another preferred embodiment, the latch bolt is formed hollow and has an axial bore along the latch axis, wherein the shaft extends inside the bore. In such a way, a very compact design is enabled.

According to yet another preferred embodiment, the latch bolt and the nut are formed integrally. This means, the shaft axis coincides with latch axis. This relates to a very simple design.

According to an alternative preferred embodiment, the latch bolt and the nut are formed separately and are coupled to one another in a linearly fixed manner. In such a way, the nut and the latch bolt can be formed without rotational coupling and/or without axial alignment.

In particular, it is preferred that the latch bolt is coupled to the nut by a torque proof joint, so that the latch bolt rotates together with the nut. This relates to a particularly simple design.

It is further preferred that the latch bolt is supported at the housing by at least one second roller bearing allowing rotation of the latch bolt about the latch axis as well as linear movement of the latch bolt along the latch axis. In such a way, the latch bolt is supported in a radial direction but can rotate freely about the latch axis.

It is particularly preferred that the flight latch device comprises an offset compensation, wherein the shaft is mounted to the housing by a first cardan joint and the latch bolt is coupled to the nut by a second cardan joint allowing angular play between the shaft, specifically the shaft axis, and the latch bolt, specifically the latch axis, so that the latch bolt might by slightly offset from the first cardan joint and the latch axis might be angled to the shaft axis. In such a way, a simple and efficient offset compensation is provided, which might be advantageous when the latch bolt elastically deforms or moves in the latched position under load.

Alternatively, it is preferred that the latch bolt is coupled to the nut by a torque free joint, such as a third roller bearing, so that the nut can rotate freely relative to the latch bolt. In such a way, the latch bolt is rotationally independent from the nut.

In particular, it is preferred that the latch bolt is supported at the housing by a second linear guide allowing linear movement in parallel to the shaft axis and inhibiting rotation of the latch bolt about the shaft axis, e.g. by a groove and tongue guide, so that the latch bolt does not rotate together with the nut. In such a way, the latch bolt is rotationally fixed and can be inserted into the latch lugs without rotating, which might be easier in some cases.

It is further preferred that the flight latch device comprises an offset compensation, wherein the shaft is mounted to the housing by a first cardan joint and the latch bolt is coupled to the nut by a compensational ball bearing allowing angular play between the shaft, specifically the shaft axis, and the latch bolt, specifically the latch axis, so that the latch bolt might be slightly offset from the first cardan joint and the latch axis might be angled to the shaft axis. In such a way, a simple and efficient offset compensation is provided, which might be advantageous when the latch bolt elastically deforms or moves in the latched position under load.

According to a preferred embodiment, the first linear guide comprises a slider mounted to the stator part of the motor and running in a corresponding linear groove in the housing essentially parallel to the latch axis and/or shaft axis. Such a slider and groove connection relates to a very simple and efficient linear guide.

According to a further preferred embodiment, power is transferred from the housing to the motor via the first linear guide. Preferably, electric power is transferred via the slider running in the groove in constant contact to the groove, preferably in the way of a sliding contact. This relates to a very simple and efficient power supply to the motor.

A further aspect of the present invention relates to a flight latch device for latching a foldable wing tip portion of a wing for an aircraft in an extended position relative to a fixed wing, as used in the wing according to any of the afore-described embodiments. The features and effects described above in connection with the wing apply vis-à-vis to the flight latch device. Specifically, the flight latch device comprises a housing, a latch bolt, and a motor. The housing is configured to be fixedly mounted to one of the fixed wing and the foldable wing tip portion. The latch bolt extends elongated along a latch axis, is supported at the housing and is linearly movable relative to the housing along the latch axis between a latched position, where the latch bolt is configured to engage corresponding latch lugs of the foldable wing tip portion and/or the fixed wing, and an unlatched position, where the latch bolt is configured to be disengaged with the latch lug of at least one of the foldable wing tip portion and the fixed wing. Preferably, the housing is configured to be mounted to the fixed wing and the latch bolt in the latched position is configured to engage latch lugs of both the fixed wing and the foldable wing tip portion, while in the unlatched position the latch bolt is configured to be disengaged at least from the latch lug or lugs of the foldable wing tip portion, preferably from the latch lugs of both the foldable wing tip portion and the fixed wing. The motor is preferably an electric motor and is supported at the housing and/or at the latch bolt and is configured for driving the latch bolt between the latched position and the unlatched position. The flight latch device comprises a threaded shaft extending elongated along a shaft axis, having an external thread and being mounted to the housing in a torque proof manner, i.e. not rotatable about the shaft axis. The flight latch device comprises a nut having an internal thread engaging the external thread of the shaft, so that the nut can rotate about the shaft along the external thread. The motor is arranged coaxially around the nut. An inner rotor part of the motor is mounted to the nut in a torque proof manner. Torque proof in this connection means either fixedly, so that no relative rotation about the shaft axis is allowed between the nut and the rotor part, or via a gear unit, specifically a planet reduction gear, for controlled relative rotation of the nut and the rotor part about the shaft axis. An outer stator part of the motor is connected to the rotor part in such a way that it is rotatable about the shaft axis and linearly fixed to the rotor part, e.g. via a first roller bearing. Further, the stator part is connected to the housing by a first linear guide allowing linear movement in parallel to the shaft axis and inhibiting rotation of the stator part about the shaft axis, e.g. by a groove and tongue guide. The nut, in turn, is connected to the latch bolt, integrally or two separate parts that are coupled, for common linear movement with the latch bolt, preferably by a linearly fixed connection. The nut being connected to the latch bolt might include that either the nut is formed integrally with the latch bolt or the nut and the latch bolt are formed as two separate parts that are coupled to one another. In such a way, a particularly simple and reliable flight latch device with minimum space requirements is formed.

Yet a further aspect of the present invention relates to an aircraft comprising a wing according to any of the embodiment described above or a flight latch device according to any of the embodiment described above. The features and effects described above in connection with the wing and the flight latch device apply vis-à-vis to the aircraft.

BRIEF DESCRIPTION OF THE DRAWINGS

Hereinafter, a preferred embodiment of the invention is described in more detail by mean of a drawing. The drawing shows in FIG. 1 a perspective view of an aircraft according to an embodiment of the invention, FIG. 2 a perspective detail view of a flight latch device at a wing of the aircraft shown in FIG. 1, and FIG. 3 a cross sectional view along the latch and shaft axes of the flight latch device shown in FIG. 2.

DETAILED DESCRIPTION OF SOME EMBODIMENTS

Figure 1:
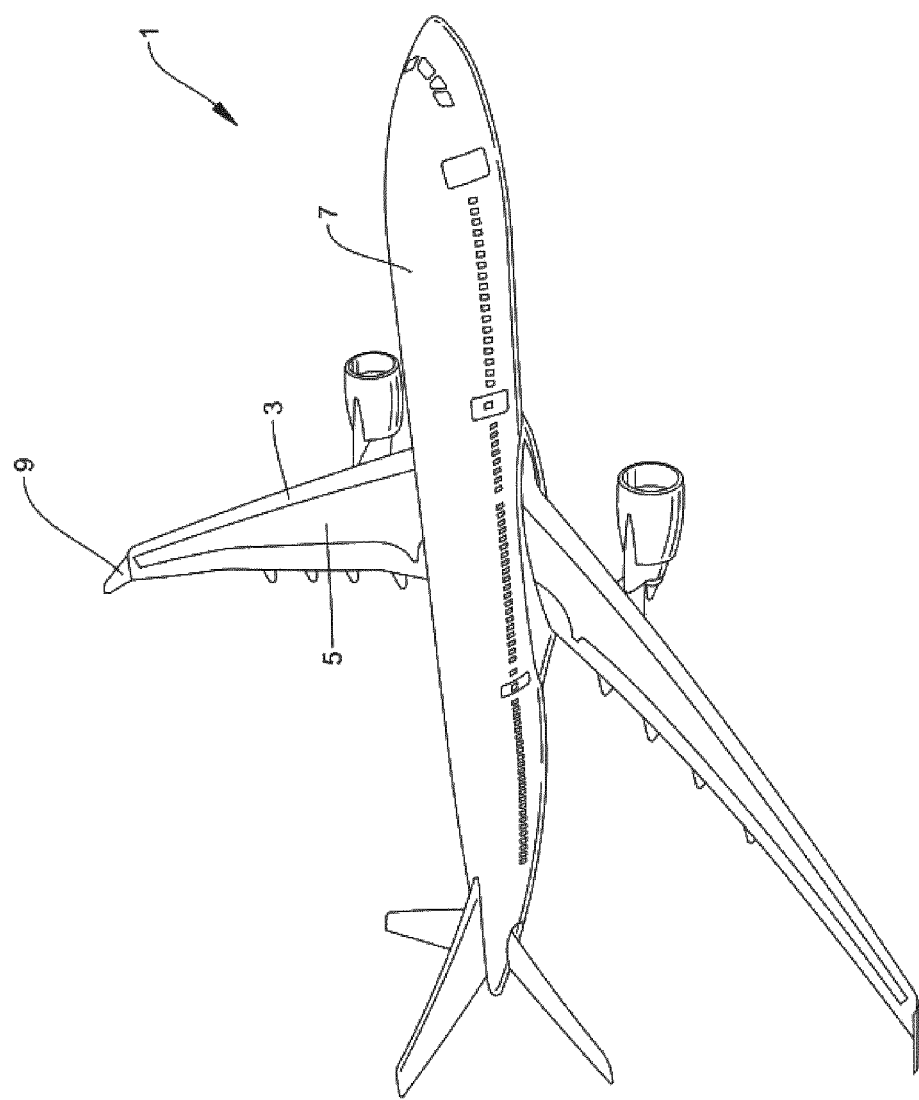

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
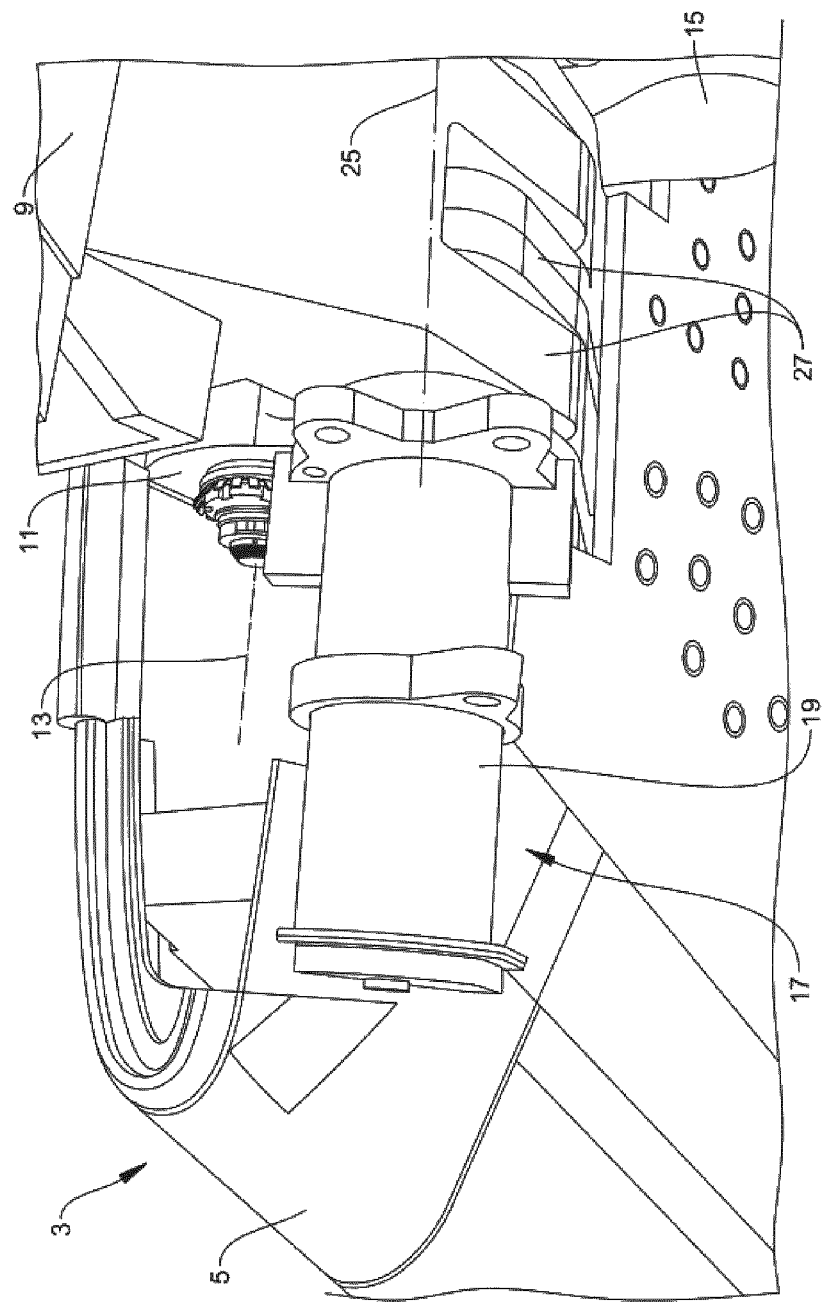

FIG. 2 illustrates the wing 3 of the aircraft 1 shown in FIG. 1 in further detail. The foldable wing tip portion 9 is mounted to the fixed wing 5 via hinges 11 rotatable about a hinge axis 13 between an extended position and a folded position. In the extended position the foldable wing tip portion 9 extends as a continuous extension of the fixed wing 5 in a common plane with the fixed wing 5, wherein in the folded position 17 the foldable wing tip portion 9 extends upwards in order to reduce the overall span of the aircraft 1. The hinge axis 13 extends in parallel to a chord line and in a flight direction of the aircraft 1. Further, the wing 3 comprises an actuation unit 15 for moving the foldable wing tip portion 9 about the hinge axis 13 relative to the fixed wing 5.

Figure 3:
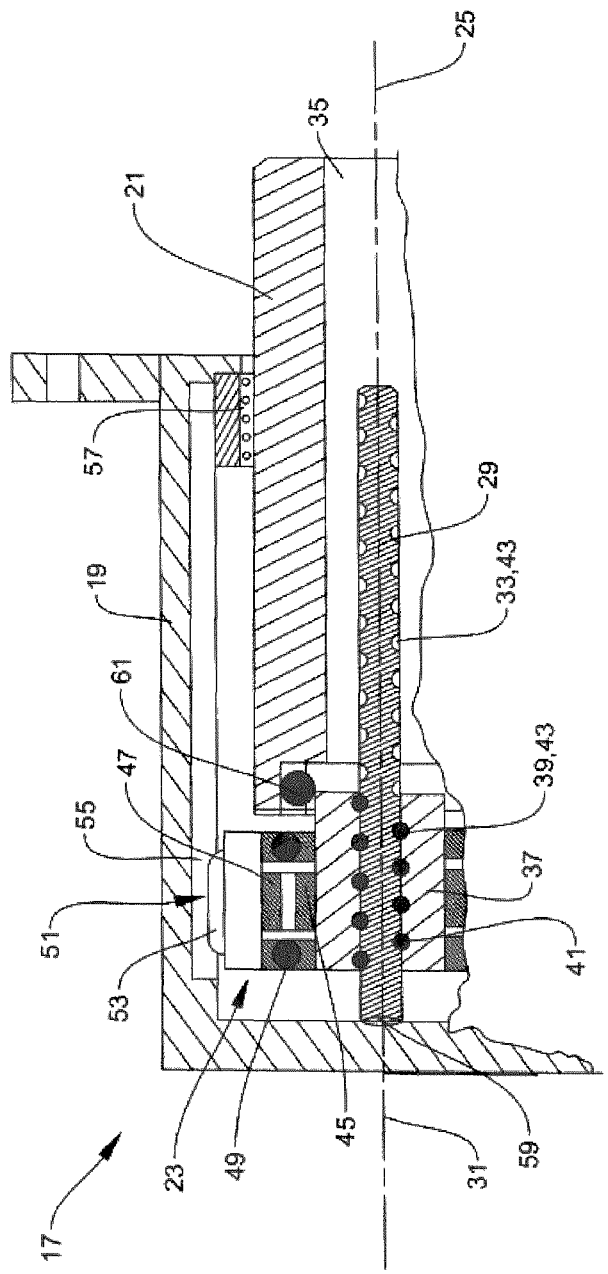

As shown in FIGS. 2 and 3, the wing 3 further comprises a flight latch device 17 for latching the foldable wing tip portion 9 in the extended position. The flight latch device 17 comprises a housing 19, a latch bolt 21, and a motor 23. The housing 19 is fixedly mounted to the fixed wing 5. The latch bolt 21 extends elongated along a latch axis 25, is supported inside the housing 19 and is linearly movable relative to the housing 19 along the latch axis 25 between a latched position, where the latch bolt 21 engages corresponding latch lugs 27 of the foldable wing tip portion 9 and the fixed wing 5, and an unlatched position, where the latch bolt 21 is disengaged from the latch lugs 27 of at least the foldable wing tip portion 9. The motor 23 is an electric motor, is supported at the housing 19 and is configured for driving the latch bolt 21 between the latched position and the unlatched position.

As visible in the cross sectional view of FIG. 3, the flight latch device 17 comprises a threaded shaft 29 that extends elongated along a shaft axis 31 and that is mounted to the housing 19 in a torque proof manner. Also, the shaft 29 is provided with an external thread 33 and extends inside an axial bore 35 in the latch bolt 21.

The flight latch device 17 further comprises a nut 37 having an internal thread 39 engaging the external thread 33 of the shaft 29, so that the nut 37 can rotate about the shaft 29 along the external thread 33. In the present embodiment, the shaft 29 is formed as ball screw and the nut 37 is formed as ball nut so that the internal thread 39 of the nut 37 engages the external thread 33 of the shaft 29 by a ball bearing including balls 41 running in corresponding grooves 43 of the internal and external threads 39, 33.

The motor is arranged coaxially around the nut 37. An inner rotor part 45 of the motor 23 is mounted to the nut 37 in a torque proof manner. An outer stator part 47 of the motor 23 is connected to the rotor part 45 via a first roller bearing 49 so that it is rotatable about the shaft axis 31 relative to the rotor part 45 and linearly fixed to the rotor part 45. Further, the stator part 47 is connected to the housing 19 by a first linear guide 51 allowing linear movement in parallel to the shaft axis 31 and inhibiting rotation of the stator part 47 about the shaft axis 31. The first linear guide 51 comprises a slider 53 mounted to the stator part 47 of the motor 23 and running in a corresponding linear groove 55 in the housing 19 essentially parallel to the latch axis 25 and shaft axis 31. Further, electric power is transferred from the housing 19 to the motor 23 via the slider 53 running in the groove 55 in sliding contact to the groove 55.

The nut 37 is connected to the latch bolt 21 for common linear movement with the latch bolt 21, wherein the nut 37 and the latch bolt 21 are formed as two separate parts that are coupled to one another in a linearly fixed manner. In the present embodiment, the latch bolt 21 is coupled to the nut 37 by a torque proof joint, so that the latch bolt 21 rotates together with the nut 37. At the same time, the latch bolt 21 is supported at the housing 19 by at least one second roller bearing 57 allowing rotation of the latch bolt 21 about the latch axis 25 as well as linear movement of the latch bolt 21 along the latch axis 25. Further, the flight latch device 17 comprises an offset compensation, wherein the shaft 29 is mounted to the housing 19 by a first cardan joint 59 and the latch bolt 21 is coupled to the nut 37 by a second cardan joint 61 allowing angular play between the shaft axis 31 and the latch axis 25, so that the latch bolt 21 might by slightly offset from the first cardan joint 59 and the latch axis 25 might be angled to the shaft axis 31.

Alternatively, in other embodiments, the latch bolt 21 might be coupled to the nut 37 by a torque free joint, such as a third roller bearing, and the latch bolt 21 is supported at the housing 19 by a second linear guide allowing linear movement of the latch bolt 21 in parallel to the shaft axis 31 and inhibiting rotation of the latch bolt 21 about the shaft axis 31, e.g. by a groove and tongue guide, so that the latch bolt 21 does not rotate together with the nut 37.

In such a way, a very compact flight latch device 17 is provided that has reduced space requirements.

The invention claimed is:

1. A wing for an aircraft, comprising:
a fixed wing,
a foldable wing tip portion mounted to the fixed wing via a hinge rotatable about a hinge axis between an extended position and a folded position, and
a flight latch device for latching the foldable wing tip portion in the extended position,
wherein the flight latch device comprises a housing mounted to one of the fixed wing and the foldable wing tip portion, a latch bolt supported at the housing and linearly movable relative to the housing between a latched position and an unlatched position, and a motor for driving the latch bolt between the latched and unlatched positions,
wherein the flight latch device comprises a threaded shaft having an external thread and being mounted to the housing in a torque proof manner,
the flight latch device comprises a nut having an internal thread engaging the external thread of the shaft, so that the nut can rotate about the shaft along the external thread,
the motor is arranged coaxially around the nut, wherein a rotor part is mounted to the nut in a torque proof manner, and wherein a stator part is rotatably connected to the rotor part and is connected to the housing by a first linear guide allowing linear movement and inhibiting rotation of the stator part, and
the nut is connected to the latch bolt for common linear movement with the latch bolt.

2. The wing according to claim 1, wherein the shaft is formed as ball screw and the nut is formed as ball nut so that the internal thread of the nut engages the external thread of the shaft by a ball bearing.

3. The wing according to claim 1, wherein the latch bolt has an axial bore, and wherein the shaft extends inside the bore.

4. The wing according to claim 1, wherein the latch bolt and the nut are formed integrally.

5. The wing according to claim 1, wherein the latch bolt and the nut are formed separately and are coupled to one another in a linearly fixed manner.

6. The wing according to claim 5, wherein the latch bolt is coupled to the nut by a torque proof joint, so that the latch bolt rotates together with the nut.

7. The wing according to claim 6, wherein the latch bolt is supported at the housing by a second roller bearing.

8. The wing according to claim 6, wherein the flight latch device comprises an offset compensation, wherein the shaft is mounted to the housing by a first cardan joint and the latch bolt is coupled to the nut by a second cardan joint.

9. The wing according to claim 5, wherein the latch bolt is coupled to the nut by a torque free joint, so that the nut can rotate freely relative to the latch bolt.

10. The wing according to claim 9, wherein the flight latch device comprises an offset compensation, wherein the shaft is mounted to the housing by a first cardan joint and the latch bolt is coupled to the nut by a compensational ball bearing allowing angular play between the shaft and the latch bolt.

11. The wing according to claim 1, wherein the first linear guide comprises a slider mounted to the stator part of the motor and running in a corresponding groove in the housing.

12. The wing according to claim 1, wherein power is transferred to the motor via the first linear guide.

13. An aircraft comprising the wing according to claim 1.

14. A flight latch device for latching a foldable wing tip portion of a wing for an aircraft in an extended position relative to a fixed wing,
   wherein the flight latch device comprises a housing configured for being mounted to one of the fixed wing and the foldable wing tip portion, a latch bolt supported at the housing and linearly movable relative to the housing between a latched position and an unlatched position, and a motor for driving the latch bolt between the latched and unlatched positions,
   the flight latch device comprises a threaded shaft having an external thread and being mounted to the housing in a torque proof manner,
   the flight latch device comprises a nut having an internal thread engaging the external thread of the shaft, so that the nut can rotate about the shaft along the external thread,
   the motor is arranged coaxially around the nut, wherein a rotor part is mounted to the nut in a torque proof manner, and wherein a stator part is rotatably connected to the rotor part and is connected to the housing by a first linear guide allowing linear movement and inhibiting rotation of the stator part, and
   the nut is connected to the latch bolt for common linear movement with the latch bolt.

15. An aircraft comprising the flight latch device according to claim 14.

* * * * *